US012769282B2

(12) United States Patent
Kim et al.

(10) Patent No.: US 12,769,282 B2
(45) Date of Patent: Oct. 20, 2026

(54) ROBOT AND METHOD FOR CONTROLLING THEREOF

(71) Applicant: Samsung Electronics Co., Ltd., Suwon-si (KR)

(72) Inventors: Kihoon Kim, Suwon-si (KR); Junggap Kuk, Suwon-si (KR); Sangkyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 18/302,377

(22) Filed: Apr. 18, 2023

(65) Prior Publication Data

US 2023/0251632 A1 Aug. 10, 2023

Related U.S. Application Data

(63) Continuation of application No. PCT/KR2022/012422, filed on Aug. 19, 2022.

(30) Foreign Application Priority Data

Aug. 25, 2021 (KR) ........................ 10-2021-0112646

(51) Int. Cl.
*B25J 11/00* (2006.01)
*G05B 19/4155* (2006.01)
(Continued)

(52) U.S. Cl.
CPC ....... *G05B 19/4155* (2013.01); *B25J 11/0005* (2013.01); *G06V 40/10* (2022.01); *G10L 13/04* (2013.01); *G05B 2219/50391* (2013.01)

(58) Field of Classification Search
CPC ........... G05D 1/2285; G05D 2105/315; G05D 2109/10; G05D 2107/67; G10L 13/04;
(Continued)

(56) References Cited

U.S. PATENT DOCUMENTS 9,431,027 B2 8/2016 Ng-Thow-Hing et al.
10,916,236 B2 2/2021 Kinoshita et al.
(Continued)

FOREIGN PATENT DOCUMENTS

JP 2008-168375 A 7/2008
JP 2009-233764 A 10/2009
(Continued)

OTHER PUBLICATIONS

International Search Report dated Dec. 6, 2022, issued in International Patent Application No. PCT/KR2022/012422.
(Continued)

*Primary Examiner* — Stephen Holwerda
(74) *Attorney, Agent, or Firm* — Jefferson IP Law, LLP

(57) ABSTRACT

A robot is provided. The robot includes a camera, a speaker, at least one motor, memory, and a processor, the processor detects a user based on an image obtained through the camera, obtains a plurality of sentences to be uttered by the robot to the user, identifies a first sentence to which a motion to be performed while the robot utters is not allocated among the plurality of sentences, identifies a second sentence to be uttered in a second time section adjacent to a first time section in which the first sentence is to be uttered, obtains a first motion different from a second motion allocated to the second sentence among a plurality of motions pre-stored in the memory as a motion corresponding to the first sentence, and controls the speaker to output a voice corresponding to the first sentence and performs the first motion while the voice is output.

20 Claims, 8 Drawing Sheets

(51) Int. Cl.
*G06V 40/10* (2022.01)
*G10L 13/04* (2013.01)

(58) Field of Classification Search
CPC ................ G10L 13/00; G05B 19/4155; G05B 2219/50391; B25J 11/0005; B25J 11/008; G06F 18/22; G06F 3/167; G06V 10/82; G06V 40/10; G06V 20/58
See application file for complete search history.

(56) References Cited

U.S. PATENT DOCUMENTS

| | | | | |
|---|---|---|---|---|
| 2006/0195598 | A1* | 8/2006 | Fujita | H04L 67/02 709/230 |
| 2009/0149991 | A1* | 6/2009 | Sumida | G06N 3/008 700/246 |
| 2012/0191460 | A1* | 7/2012 | Ng-Thow-Hing | G10L 21/10 704/E11.001 |
| 2015/0217449 | A1* | 8/2015 | Meier | B25J 9/163 901/1 |
| 2018/0126561 | A1 | 5/2018 | Takahashi et al. | |
| 2018/0178372 | A1* | 6/2018 | Lee | G06V 40/171 |
| 2018/0229372 | A1* | 8/2018 | Breazeal | B25J 11/0015 |
| 2019/0279643 | A1* | 9/2019 | Miyazaki | G06F 3/167 |
| 2019/0366557 | A1* | 12/2019 | Gewickey | B25J 11/0005 |

FOREIGN PATENT DOCUMENTS

| | | | |
|---|---|---|---|
| JP | 2014-504959 | A | 2/2014 |
| JP | 6122792 | B2 | 4/2017 |
| JP | 6798258 | B2 | 12/2020 |
| JP | 7201984 | B2 | 1/2023 |
| JP | 2004-034273 | A | 2/2024 |
| KR | 10-2014-0114700 | A | 9/2014 |
| KR | 10-2018-0048039 | A | 5/2018 |
| KR | 10-1997072 | B1 | 10/2019 |
| KR | 10-2021-0078172 | A | 6/2021 |

OTHER PUBLICATIONS

Online processing for speech-driven gesture motion generation in android robots, XP 033740823; IEEE-RAS 19th International Conference on Humanoid Robots (Humanoids), Toronto, Canada, Oct. 15, 2019.
Takano et al., Statistically Integrated Semiotics that Enables Mutual Inference Between Linguistic and Behavioral Symbols for Humanoid Robots, XP 031483460; 2009 IEEE International Conference on Robotics and Automation, Kobe International Conference Center Kobe, Japan, May 12, 2009.
Sumi et al., Proposal of Communication Robot With Simple Motions; Graduate School of System Design, XP033091306, IEEE, 2017.
Extended European Search Report dated Aug. 1, 2024, issued in European Patent Application No. 22861643.9.
Extended European Search Report dated Jun. 26, 2025, issued in a European Patent Application No. 25180208.8.
Korean Office Action dated Mar. 24, 2026, issued in Korean Patent Application No. 10-2021-0112646.
European Search Report dated May 8, 2026, issued in European Patent Application No. 25180208.8.

* cited by examiner

ST → MOTION ID (columns) / MOTION ID (rows)

| | 1 | 2 | ... | 10 | ... | N |
|---|---|---|---|---|---|---|
| 1 | 1 | 0.4 | ... | 0.4 | ... | 0.6 |
| 2 | 0.4 | 1 | ... | 0.6 | ... | 0.2 |
| ... | ... | ... | ... | ... | ... | ... |
| N-1 | 0.3 | 0.6 | ... | 0.5 | ... | 0.5 |
| N | 0.6 | 0.2 | ... | 0.2 | ... | 1 |

| | 1 | 2 | ... | 10 | ... | N | Avg |
|---|---|---|---|---|---|---|---|
| 1 | 1 | 0.4 | ... | 0.4 | ... | 0.6 | 0.8 |
| 2 | 0.4 | 1 | ... | 0.6 | ... | 0.2 | 0.3 |
| ... | ... | ... | ... | ... | ... | ... | |
| N-1 | 0.3 | 0.6 | ... | 0.5 | ... | 0.5 | 0.4 |
| N | 0.6 | 0.2 | ... | 0.2 | ... | 1 | 0.8 |

ROBOT AND METHOD FOR CONTROLLING THEREOF

CROSS-REFERENCE TO RELATED APPLICATION(S)

This application is a continuation application, claiming priority under § 365 (c), of an International application No. PCT/KR2022/012422, filed on Aug. 19, 2022, which is based on and claims the benefit of a Korean patent application number 10-2021-0112646, filed on Aug. 25, 2021, in the Korean Intellectual Property Office, the disclosure of which is incorporated by reference herein in its entirety.

TECHNICAL FIELD

The disclosure relates to a robot and a method for controlling thereof. More particularly, the disclosure relates to a robot capable of performing a motion while uttering and a method for controlling thereof.

BACKGROUND ART

Along with development of electronic technologies, various service robots are being used. For example, service robots that explain works of art in a gallery or explain products in a store are being used.

The above information is presented as background information only to assist with an understanding of the disclosure. No determination has been made, and no assertion is made, as to whether any of the above might be applicable as prior art with regard to the disclosure.

DISCLOSURE

Technical Problem

Meanwhile, a service robot of the related art extracted a keyword from a sentence to be uttered and obtained a motion corresponding to the extracted keyword. In this case, if a similar keyword is extracted from a following sentence, the robot performs similar motions consecutively. If the robot performs the similar or same motion consecutively, a user may feel that the robot is malfunctioning or the motion of the robot is not natural.

Therefore, a need exists for a technology for a robot not to perform the same motion consecutively and to perform a motion more naturally.

Technical Solution

Aspects of the disclosure are to address at least the above-mentioned problems and/or disadvantages and to provide at least the advantages described below. Accordingly, an aspect of the disclosure is to provide a robot for obtaining a motion different from a motion performed in a time section adjacent to a current time section as a motion corresponding to a sentence to be uttered in the current time section.

Additional aspects will be set forth in part in the description which follows and, in part, will be apparent from the description, or may be learned by practice of the presented embodiments.

In accordance with an aspect of the disclosure, a robot is provided. The robot includes a camera, a speaker, a driving unit, a memory storing at least one instruction, and a processor, in which the processor is configured to detect a user based on an image obtained through the camera, obtain a plurality of sentences to be uttered by the robot to the user, identify a first sentence to which a motion to be performed while the robot utters is not allocated among the plurality of sentences, identify a second sentence to be uttered in a second time section adjacent to a first time section in which the first sentence is to be uttered, identify a first motion different from a second motion allocated to the second sentence among a plurality of motions pre-stored in the memory as a motion corresponding to the first sentence, and control the speaker to output a voice corresponding to the first sentence and control the driving unit to perform the first motion while the voice is output.

The processor may be configured to identify one or more motions having a similarity to the second motion less than a predetermined value among the plurality of pre-stored motions, and identify one of the one or more motions randomly and obtain the motion as the first motion.

The processor may be configured to obtain similarities between the plurality of pre-stored motions and the second motion by comparing histograms corresponding to the plurality of pre-stored motions and a histogram corresponding to the second motion.

The memory may store a similarity table including similarities between the plurality of pre-stored motions including the second motion, and the processor may be configured to obtain the first motion based on the similarity table.

The processor may be configured to identify a third motion allocated to a third sentence to be uttered in a third time section that is adjacent to the first time section and different from the second time section, obtain first similarities between the plurality of pre-stored motions and the second motion and obtain second similarities between the plurality of pre-stored motions and the third motion, obtain a plurality of average values of the first similarities and the second similarities corresponding to the plurality of pre-stored motions, identify one or more average values less than a predetermined value among the plurality of average values and identify one or more motions corresponding to the one or more average values among the plurality of pre-stored motions, and identify one of the one or more motions randomly and obtain the motion as the first motion.

The processor may be configured to obtain a size of the second motion based on information on the second motion, based on a ratio of a size of the first motion to the size of the second motion being greater than a threshold value, adjust the size of the first motion based on the size of the first motion and the size of the second motion, and based on the ratio of the size of the first motion to the size of the second motion being less or equal to the threshold value, maintain the size of the first motion.

The processor may be configured to calculate a weight based on the ratio of the size of the first motion to the size of the second motion, and adjust the size of the first motion based on the weight so that the size of the first motion is less than the size of the second motion.

In accordance with another aspect of the disclosure, a method for controlling a robot is provided. The method includes detecting a user, obtaining a plurality of sentences to be uttered by the robot to the detected user, identifying a first sentence to which a motion to be performed while the robot utters is not allocated among the plurality of sentences, identifying a second sentence to be uttered in a second time section adjacent to a first time section in which the first sentence is to be uttered, identifying a first motion different from a second motion allocated to the second sentence among a plurality of pre-stored motions as a motion corresponding to the first sentence, and performing the first motion while uttering the first sentence.

The obtaining of the first motion may include identifying one or more motions having a similarity to the second motion less than a predetermined value among the plurality of pre-stored motions, and identifying one of the one or more motions randomly and obtaining the motion as the first motion.

The identifying of the one or more motions may include obtaining similarities between the plurality of pre-stored motions and the second motion by comparing histograms corresponding to the plurality of pre-stored motions and a histogram corresponding to the second motion.

The robot may store a similarity table including similarities between the plurality of pre-stored motions including the second motion, and the obtaining the first motion may include obtaining the first motion based on the similarity table.

The obtaining of the first motion may include identifying a third motion allocated to a third sentence to be uttered in a third time section that is adjacent to the first time section and different from the second time section, obtaining first similarities between the plurality of pre-stored motions and the second motion and obtaining second similarities between the plurality of pre-stored motions and the third motion, obtaining a plurality of average values of the first similarities and the second similarities corresponding to the plurality of pre-stored motions, identifying one or more average values less than a predetermined value among the plurality of average values and identifying one or more motions corresponding to the one or more average values among the plurality of pre-stored motions, and identifying one of the one or more motions randomly and obtaining the motion as the first motion.

The control method may further include obtaining a size of the second motion based on information on the second motion, based on a ratio of a size of the first motion to the size of the second motion being greater than a threshold value, adjusting the size of the first motion based on the size of the first motion and the size of the second motion, and based on the ratio of the size of the first motion to the size of the second motion being less or equal to the threshold value, maintaining the size of the first motion.

The adjusting of the size of the first motion may include calculating a weight based on the ratio of the size of the first motion to the size of the second motion, and adjusting the size of the first motion based on the weight so that the size of the first motion is less than the size of the second motion.

The solution of the disclosure is not limited to the above solutions and solutions not mentioned above may be clearly understood by those skilled in the art of the disclosure from this specification and accompanying drawings.

Effect of Invention

According to various embodiments of the disclosure, the robot may perform the various motions naturally. Therefore, the feeling of satisfaction of the user may be enhanced.

In addition, effects predicted to be exhibited by the aspects of the disclosure will be described directly or implicitly in the description of embodiments of the disclosure. For example, various effects predicted according to the embodiments of the disclosure will be described in the description which will be described later.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION OF EMBODIMENTS

Figure 1:
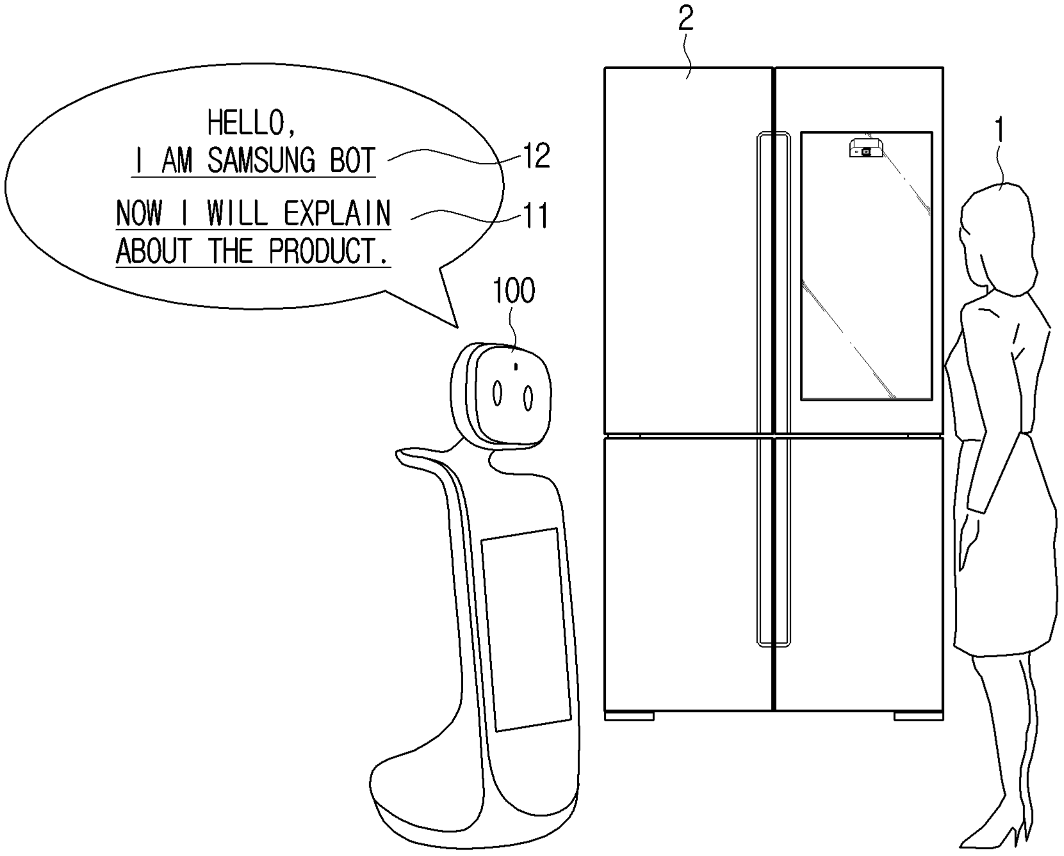
FIG. 1 is a diagram illustrating an operation of a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first," "second," or the like may be used for describing various elements but the elements may not be limited by the terms. The terms are used only to distinguish one element from another.

It is to be understood that the terms, such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

Hereinafter, with reference to the accompanying drawings, embodiments of the disclosure will be described for those skilled in the art to easily practice the embodiments. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

FIG. 1 is a diagram illustrating an operation of a robot according to an embodiment of the disclosure.

Referring to FIG. 1, a robot 100 may utter a plurality of sentences to a user 1. For example, the robot 100 may utter a first sentence 11 for explaining a product 2 and a second sentence 12 for introducing itself.

The robot 100 may perform a motion while uttering the sentences. For example, the robot 100 may perform a motion of shaking a head from side to side while uttering the second sentence 12. Meanwhile, the motion to be performed by the robot 100 may be allocated to at least a part of the sentence to be uttered by the robot 100 in advance. For example, the motion of shaking the head from side to side may be selected by a designer of the robot 100 and allocated to the second sentence 12 in advance.

The sentences to be uttered by the robot 100 may include a sentence to which the motion is not allocated. For example, no motion may be allocated to the first sentence 11. The robot 100 may identify a sentence to which the motion is not allocated and obtain a motion corresponding to the identified sentence. The robot 100 may perform the obtained motion while uttering the identified sentence. For example, the robot 100 may obtain a motion of turning the head towards the product 2 as the motion corresponding to the first sentence 11. The robot 100 may perform the motion of turning the head towards the product 2 while uttering the first sentence 11.

Meanwhile, if a first motion corresponding to the first sentence 11 to be uttered in an adjacent time section and a second motion allocated to the second sentence 12 are the same as each other or similar to each other, the first motion and the second motion may not be clearly distinguished. Accordingly, the user 1 may feel that the robot 100 is malfunctioning or operating unnaturally.

In order to prevent this, the robot 100 may obtain a motion different from the second motion allocated to the second sentence 12 as the first motion corresponding to the first sentence 11. For example, the robot 100 may obtain one or more motions having similarity to the second motion lower than a predetermined value among a plurality of motions stored in advance. The robot 100 may identify one motion randomly from the one or more identified motions and obtain the one identified motion as the first motion.

Since the similarity between the first motion and the second motion is lower than the predetermined value, the first motion and the second motion may be clearly distinguished. Accordingly, the user 1 may feel that the robot 100 operates naturally. In addition, since the first motion is selected randomly, the motion performed by the robot 100 may be different each time the robot utters the first sentence 11. In other words, the motion of the robot 100 may be diverse. Accordingly, the user 1 may feel that the robot 100 operates more naturally, thereby enhancing feeling of satisfaction of the user 1.

Figure 2:
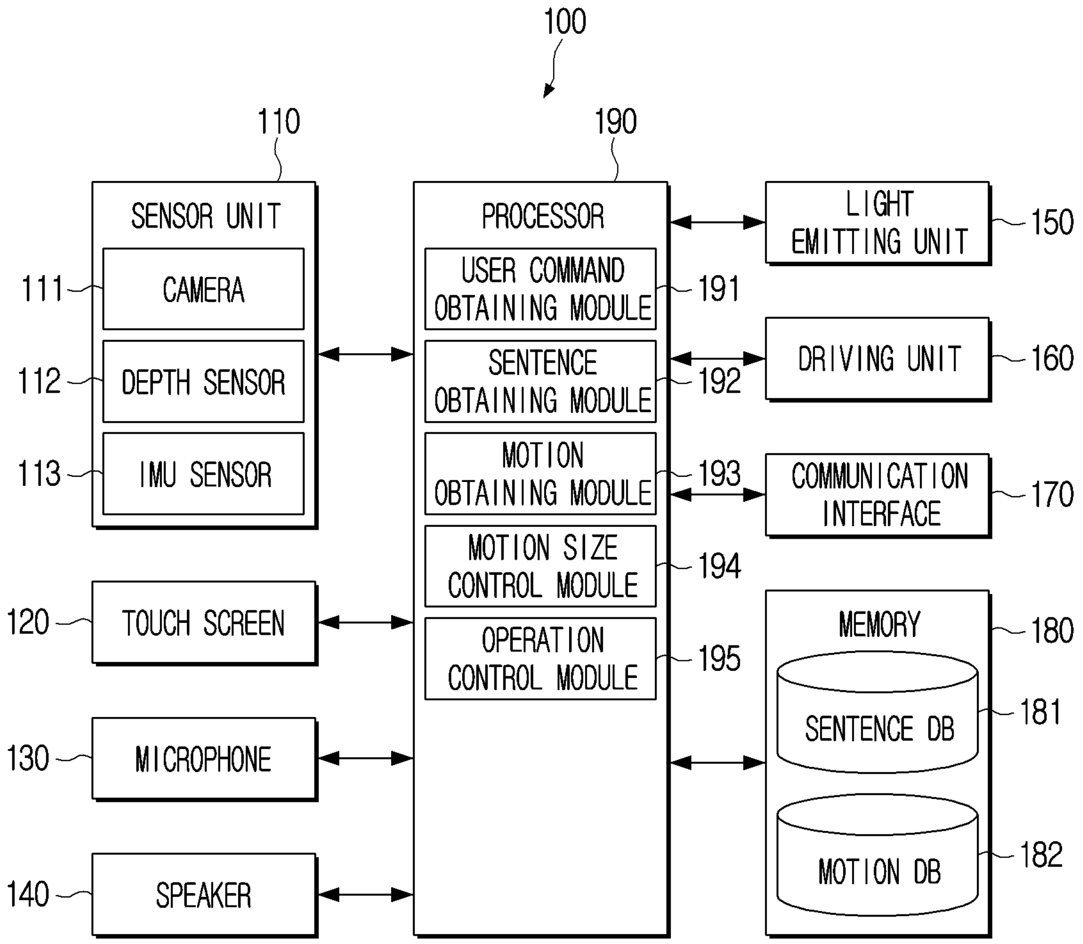
FIG. 2 is a block diagram illustrating a configuration of a robot according to an embodiment of the disclosure.

FIG. 2 is a block diagram illustrating a configuration of a robot according to an embodiment of the disclosure.

Referring to FIG. 2, the robot 100 may include a sensor unit 110, a touch screen 120, a microphone 130, a speaker 140, a light emitting unit 150, a driving unit 160, a communication interface 170, a memory 180, and a processor 190. For example, the robot 100 may be a service robot. Meanwhile, the configuration of the robot 100 is not limited to the configuration illustrated in FIG. 2, and the configuration apparent to those skilled in the art may be added.

The sensor unit 110 may include a camera 111, a depth sensor 112, and an inertial measurement unit (IMU) sensor 113. The camera 111 may be an element for obtaining an image of surrounding of the robot 100. The processor 190 may analyze the captured image obtained through the camera 111 to recognize a user. For example, the processor 190 may recognize the user included in the captured image by inputting the captured image to an object recognition model. Herein, the object recognition model may be an artificial neural network model trained to recognize an object included in an image and may be stored in the memory 180. Meanwhile, the camera 111 may include various types of image sensors. For example, the camera 111 may include at least one of a complementary metal oxide semiconductor (CMOS) image sensor and a charge coupled device (CCD) image sensor.

The depth sensor 112 may be an element for detecting an obstacle around the robot 100. The processor 190 may obtain a distance from the robot 100 to the obstacle based on a sensing value of the depth sensor 112. For example, the depth sensor 112 may include a light detection and ranging (LiDAR) sensor. Alternatively the depth sensor 112 may include a radar sensor and a depth camera.

The IMU sensor 113 may be an element for obtaining posture information of the robot 100. The IMU sensor 113 may include a gyro sensor and a geomagnetic sensor.

The touch screen 120 may obtain a touch input of the user and display a response message corresponding to a user command. For example, the touch screen 120 may display a UI element corresponding to a product explanation request. The touch screen 120 may obtain a touch input of the user who touches the UI element. When the touch input of the user is obtained, the touch screen 120 may display a response message including a text for explaining the product.

The microphone 130 may obtain a voice command of the user. The processor 190 may control the operation of the robot 100 based on the voice command of the user obtained through the microphone 130. For example, the microphone 130 may obtain a voice command of the user for requesting for the product explanation ("Please explain the product"). In this case, the processor 190 may control the touch screen 120 to display a text message for explaining the product. Alternatively, the processor 190 may control the speaker 140 to output a voice message for explaining the product.

The speaker 140 may output a voice message. For example, the speaker 140 may output a voice message corresponding to a sentence for introducing the robot 100 ("Hello, I am Samsung Bot").

The light emitting unit 150 may output light for showing face or facial expression of the robot 100. The light emitting unit 150 may include at least one LED module.

The driving unit 160 may be an element for performing various motions of the robot 100. For example, the driving unit 160 may include a wheel for moving the robot 100 and a wheel driving motor for rotating the wheel. Alternatively, the driving unit 160 may include a motor for moving a head, an arm, or a hand of the robot 100. The driving unit 160 may include a motor driving circuit which supplies a driving current to various motors and a rotation detection sensor for detecting a rotation displacement and a rotation speed.

The communication interface 170 may include at least one circuit and communicate with various types of external machines. The communication interface 170 may include at least one of a Bluetooth low energy (BLE) module, a Wi-Fi communication module, a cellular communication module, a third generation (3G) mobile communication module, a fourth generation (4G) mobile communication module, a fourth generation long term evolution (4G LTE) communication module, and a fifth generation (5G) mobile communication module.

The memory 180 may store an operating system (OS) for controlling the general operations of the constituent elements of the robot 100 and commands or data related to the constituent elements of the robot 100. For example, the memory 180 may store a sentence database 181 storing sentences to be uttered by the robot 100 to the user, and a motion database 182 storing information on motions performed by the robot 100. The sentence database 181 may store tokens configuring a sentence and information on texts corresponding to sentences. In a case of a sentence to which the motion is allocated, the sentence may be matched to identification information of the motion and stored. The motion database 182 may store information on the motion. The information on the motion may include a rotation angle for each axis corresponding to each constituent element (e.g., head) of the robot 100. For example, the rotation angle may include angle corresponding to each of a roll axis, a pitch axis, and a yaw axis.

The memory 180 may store data necessary for modules for controlling the operation of the robot 100 to perform various operations. The modules for controlling the operation of the robot 100 may include a user command obtaining module 191, a sentence obtaining module 192, a motion obtaining module 193, a motion size control module 194, and an operation control module 195. Meanwhile, the memory 180 may be implemented as a non-volatile memory (e.g., a hard disk, a solid state drive (SSD), a or flash memory), and a volatile memory.

The processor 190 may be electrically connected to the memory 180 to control general functions and operations of the robot 100. The processor 190 may load data stored in the non-volatile memory for the modules 191 to 195 to perform various operations to the volatile memory. The loading herein may refer to an operation of loading and storing the data stored in the non-volatile memory to the volatile memory so that the processor 190 is able to access the data.

The user command obtaining module 191 may obtain various user commands. For example, the user command obtaining module 191 may obtain a touch input of the user for requesting for product explanation through the touch screen 120. Alternately, the user command obtaining module 191 may obtain a voice command for requesting for the explanation through the microphone 130.

The sentence obtaining module 192 may obtain a sentence to be uttered by the robot 100 to the user. A plurality of sentences that the robot 100 is able to utter to the user may be stored in the sentence database 181 in advance. The plurality of sentences may be grouped as a sentence set according to tasks of the robot 100. For example, a plurality of sentences corresponding to a task of explaining about a refrigerator may form one sentence set.

The sentence obtaining module 192 may obtain a predetermined sentence, when a trigger event is detected. For example, the trigger event may include an event in which the user is recognized within a predetermined distance from the robot 100. If the robot 100 is a robot for explaining about a specific product (e.g., a refrigerator), the sentence obtaining module 192 may obtain a sentence of explaining the specific product.

The sentence obtaining module 192 may obtain a sentence of responding to the user command based on the user command. For example, when the user command for requesting for the explanation of the refrigerator is obtained, the sentence obtaining module may obtain a plurality of sentences for explanation of the refrigerator based on the user command.

The sentence obtaining module 192 may obtain a sentence of responding to a user's speech by performing natural language processing (NLP) with respect to the user's speech. For this, the memory 180 may store a natural language processing module in advance. The natural processing module may include a speech recognition module, a natural language understanding module, a dialog management module, a natural language generation module, and a speech synthesis module.

The motion obtaining module 193 may obtain motions corresponding to the plurality of sentences obtained through the sentence obtaining module 192. The plurality of sentences obtained through the sentence obtaining module 192 may include a sentence to which a motion is allocated and a sentence to which a motion is not allocated. The motion obtaining module 193 may obtain a motion corresponding to the sentence to which the motion is not allocated. For example, the plurality of sentences may include a first sentence to which the motion is not allocate and a second sentence to which a second motion is allocated. The motion obtaining module 193 may obtain a first motion corresponding to the first sentence.

The motion obtaining module 193 may identify the first sentence to which the motion is not allocated. The motion obtaining module 193 may identify the second sentence to be uttered in a second time section adjacent to a first time section in which the first sentence is to be uttered. The motion obtaining module 193 may obtain a motion different from the second motion allocated to the second sentence among the plurality of motions stored in the motion database 182 as the first motion.

The motion obtaining module 193 may identify one or more motions having a similarity to the second motion less than a predetermined value (e.g., 0.45) among the plurality of motions stored in the motion database 182. The motion obtaining module 193 may select one of the one or more identified motions randomly and obtain the motion as the first motion.

The motion obtaining module 193 may identify one or more motions based on a similarity table stored in the memory 180. The similarity table may include similarities between the plurality of motions stored in the motion database 182. The motion obtaining module 193 may obtain similarities between the plurality of motions by comparing a plurality of histograms respectively corresponding to the plurality of motions stored in the motion database 182.

Meanwhile, there may be a plurality of sentences to be uttered in a time section adjacent to the first time section in which the first sentence is to be uttered, and a motion may be allocated to each of the plurality of sentences. For example, the second motion may be allocated to the second sentence to be uttered in the second time section that is a time section before the first time section, and a third motion may be allocated to a third sentence to be uttered in a third time section that is a time section after the first time section.

The motion obtaining module 193 may obtain a first similarity between each of the plurality of motions stored in the motion database 182 and the second motion, and a second similarity between each of the plurality of stored motions and the third motion. The motion obtaining module 193 may obtain a plurality of average values of the first similarity and the second similarity corresponding to each of the plurality of stored motions. The motion obtaining module 193 may identify one or more average values that is less than a predetermined value among the plurality of obtained average values. The motion obtaining module 193 may identify one or more motions corresponding to the one or more identified average values among the plurality of stored motions. The motion obtaining module 193 may obtain the first motion by randomly selecting one of the one or more identified motions.

Meanwhile, the motion obtaining module 193 may obtain the motion corresponding to only some sentences, instead of obtaining the motions corresponding to all sentences to which the motion is not allocated. For example, the motion obtaining module 193 may identify a sentence having a time taken for utterance that is longer than a predetermined value (e.g., 5 seconds) among the plurality of sentences to which the motion is not allocated, and obtain a motion corresponding to the identified sentence. In other words, the motion obtaining module 193 may not obtain a corresponding motion for a sentence having the time taken for utterance that is equal to or less than a predetermined value. This is because, if the sentence is extremely short, the robot 100 may not finish the motion while uttering the sentence.

The motion size control module 194 may adjust a size of the first motion based on a size of the first motion and a size of the second motion. The motion size control module 194 may determine whether to adjust the size of the first motion by comparing the size of the first motion and the size of the second motion. For example, if a ratio of the size of the first motion to the size of the second motion is greater than a threshold value (e.g., 0.5), the motion size control module 194 may adjust the size of the first motion. On the other hand, if the ratio of the size of the first motion to the size of the second motion is less or equal to a threshold value, the motion size control module 194 may maintain the size of the first motion.

The motion size control module 194 may obtain the size of the motion based on a rotation angle of the robot 100 or a constituent element (e.g., a head) of the robot 100 corresponding to the motion. The motion size control module 194 may obtain a maximum value of the size of the rotation angle for each axis as a size of the motion. For example, if a rotation range of the robot 100 corresponding to the first motion along the roll axis is −10 degrees to +10 degrees, a rotation range along the pitch axis is −30 degrees to +30 degrees, and a rotation range along the yaw axis is −5 degrees to +5 degrees, the size of the first motion may be 30 degrees. Accordingly, as the rotation angle of the robot 100 corresponding to the motion is great, the size of the motion may be great.

The motion size control module 194 may obtain a weight based on the size of the first motion and the size of the second motion and adjust the size of the first motion so that the size of the first motion is less than the size of the second motion based on the weight. For example, the motion size control module 194 may obtain a ratio of the size of the first motion to the size of the second motion as the weight. The motion size control module 194 may adjust the size of the first motion by multiplying the weight by the rotation angle of each axis corresponding to the first motion.

The operation control module 195 may control the operation of the robot 100 based on the first sentence and the first motion. The operation control module 195 may control the speaker 140 to output a first voice message corresponding to the first sentence. The operation control module 195 may control the driving unit 160 to perform the first motion while the first voice message is output. The operation control module 195 may synchronize the time during which the first voice message is output and time during which the first motion is performed. For example, the operation control module 195 may control a first voice message output timing and a first motion performing timing so that a time point when the first voice message starts to be output corresponds to a time point when the first motion starts to be performed. In addition, the operation control module 195 may control the first voice message output timing and the first motion performing timing so that a time point when the output of the first voice message is completed corresponds to a time point when the performing of the first motion is completed.

Figure 3:
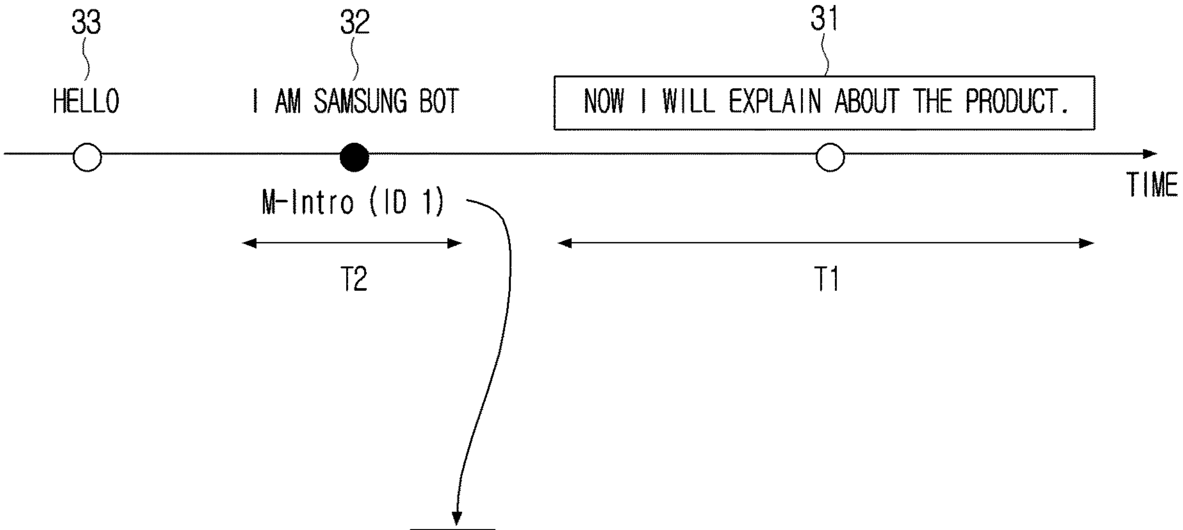
FIG. 3 is a diagram illustrating a method for obtaining a motion according to an embodiment of the disclosure.

FIG. 3 is a diagram illustrating a method for obtaining a motion according to an embodiment of the disclosure.

Referring to FIG. 3, the robot 100 may identify a sentence to which the motion is not allocated among the plurality of sentences to be uttered to the user. The robot 100 may obtain a sentence having the time taken for utterance that is longer than the predetermined time among the identified sentences. For example, the robot 100 may identify a first sentence 31 and a third sentence 33 to which the motion is not allocated. The robot 100 may obtain the first sentence 31 having the time taken for utterance that is longer than the predetermined time.

The robot 100 may obtain the first sentence corresponding to the first sentence 31. For example, the robot 100 may identify a second sentence 32 uttered in a second time section T2 adjacent to a first time section T1 in which the first sentence 31 is to be uttered. The robot 100 may obtain identification information ID 1 of a second motion M-Intro allocated to the second sentence 32.

The robot 100 may obtain the first motion based on the identification information ID 1 of the second motion M-Intro and a similarity table ST. The similarity table ST may include similarities between predetermined motions that the robot 100 is able to perform. In the similarity table ST, a higher number implies a high similarity. For example, a similarity of 1 may imply that the motions are completely the same.

The robot 100 may identify one or more motions having a similarity to the second motion M-Intro that is less than a predetermined value (e.g., 0.5) based on the identification information ID-1 of the second motion M-Intro. The robot 100 may identify one of the one or more identified motions and obtain as the first motion. For example, the robot 100 may obtain one of the plurality of motions corresponding to a plurality of pieces of identification information, such as ID2, ID N-1, and the like as the first motion.

Figure 4:
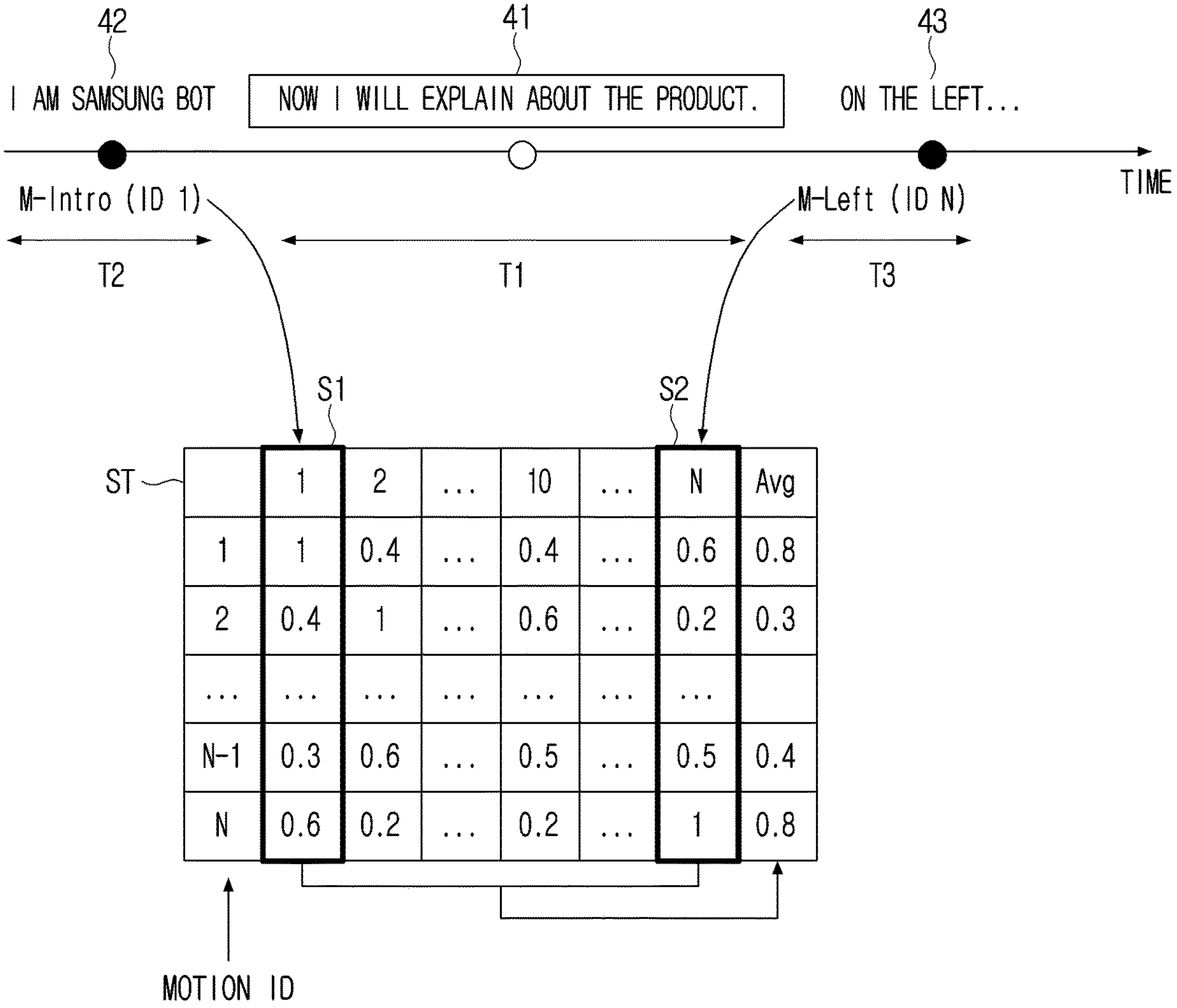
FIG. 4 is a diagram illustrating a method for obtaining a motion according to an embodiment of the disclosure.

FIG. 4 is a diagram illustrating a method for obtaining a motion according to an embodiment of the disclosure.

Referring to FIG. 4, the robot 100 may obtain a first sentence 41, a second sentence 42, and a third sentence 43 to be uttered to the user. The first sentence 41, the second sentence 42, and the third sentence 43 may be uttered in the first time section T1, the second time section T2, and a third time section T3, respectively. The first time section T1 may be adjacent to the second time section T2 and the third time section T3. The second motion M-Intro may be allocated to the second sentence 42 and a third motion M-Left may be allocated to the third sentence 43.

The robot 100 may obtain the first motion corresponding to the first sentence 41 to which the motion is not allocated. The robot 100 may identify one or more motions based on the first similarity between the plurality of pre-stored motions and the second sentence 42 and the second similarity between the plurality of pre-stored motions and the third sentence 43. The similarity table ST may include similarities between the plurality of pre-stored motions. The robot 100 may obtain first similarities S1 between the plurality of motions and the second sentence 42 and second similarities S2 between the plurality of motions and the third sentence 43 corresponding to each of the plurality of motions. The robot 100 may obtain an average Avg of the first similarities S1 and the second similarities S2. The robot 100 may obtain one or more motions having an average value Avg less than a predetermined value (e.g., 0.5). The robot 100 may identify one of the one or more identified motions randomly and obtain as the first motion. For example, the robot 100 may obtain one of the plurality of motions corresponding to the plurality of pieces of identification information, such as ID 2, ID N-1, and the like as the first motion.

Figure 5:
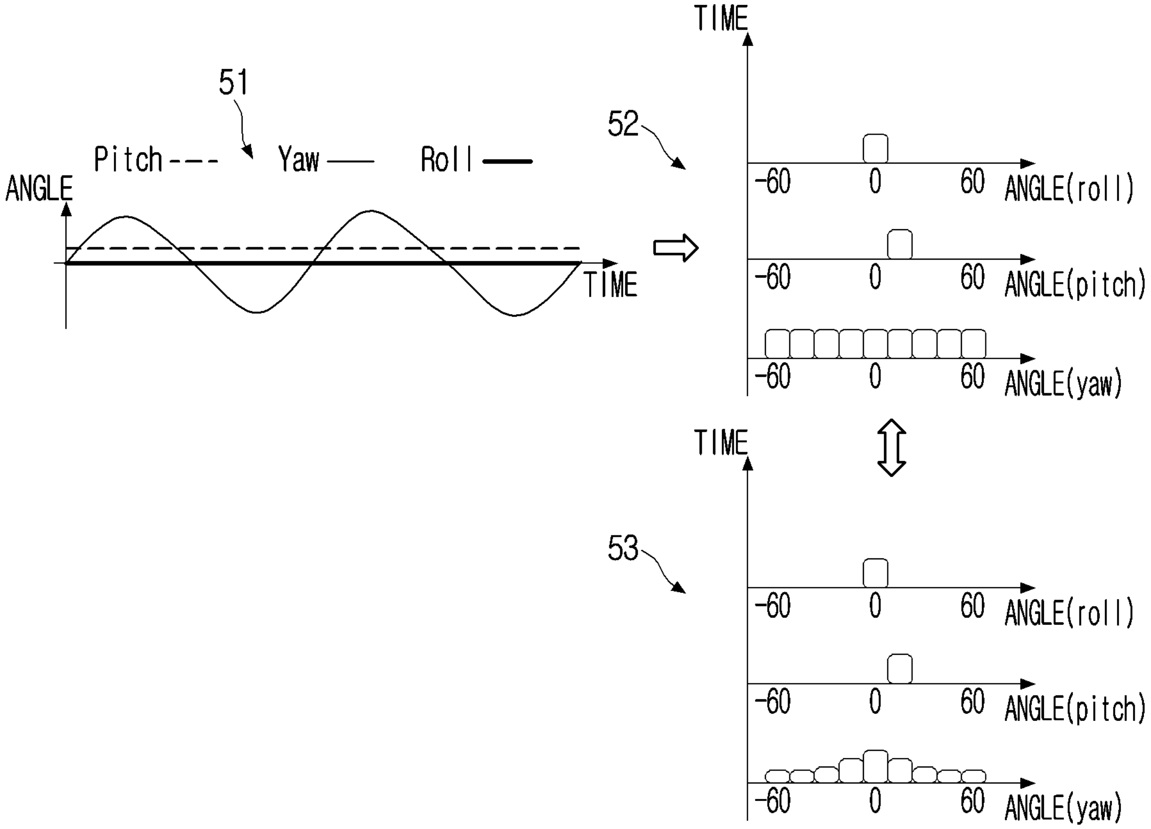
FIG. 5 is a diagram illustrating a method for determining similarity between motions according to an embodiment of the disclosure.

FIG. 5 is a diagram illustrating a method for determining similarity between motions according to an embodiment of the disclosure.

Referring to FIG. 5, the robot 100 may obtain information 51 for the first motion. The robot 100 may obtain a first histogram 52 corresponding to the information 51 for the first motion. The robot 100 may obtain the first histogram 52 corresponding to each of three axes (roll, pitch, and yaw). As described above, the robot 100 may obtain the histogram corresponding to each of the plurality of pre-stored motions.

The robot 100 may obtain the similarity between motions by comparing the histogram corresponding to each motion. For example, the robot 100 may obtain the similarity between the first motion and the second motion by comparing the first histogram 52 corresponding to the first motion and a second histogram 53 corresponding to the second motion. The robot 100 may calculate the similarity corresponding to each axis by comparing the histogram corresponding to each axis and obtain a final similarity based on an average of the similarities corresponding to the axes. For example, the robot 100 may obtain the first similarity between the roll axes of the first histogram 52 and the second histogram 53. The robot 100 may obtain the second similarity between pitch axes of the first histogram 52 and the second histogram 53. The robot 100 may obtain the third similarity between yaw axes of the first histogram 52 and the second histogram 53. The robot 100 may obtain the final similarity between the first motion and the second motion based on an average of the first similarity, the second similarity, and the third similarity. According to the method, the similarity table ST of FIGS. 3 and 4 may be obtained and stored in the memory 180.

Figure 6:
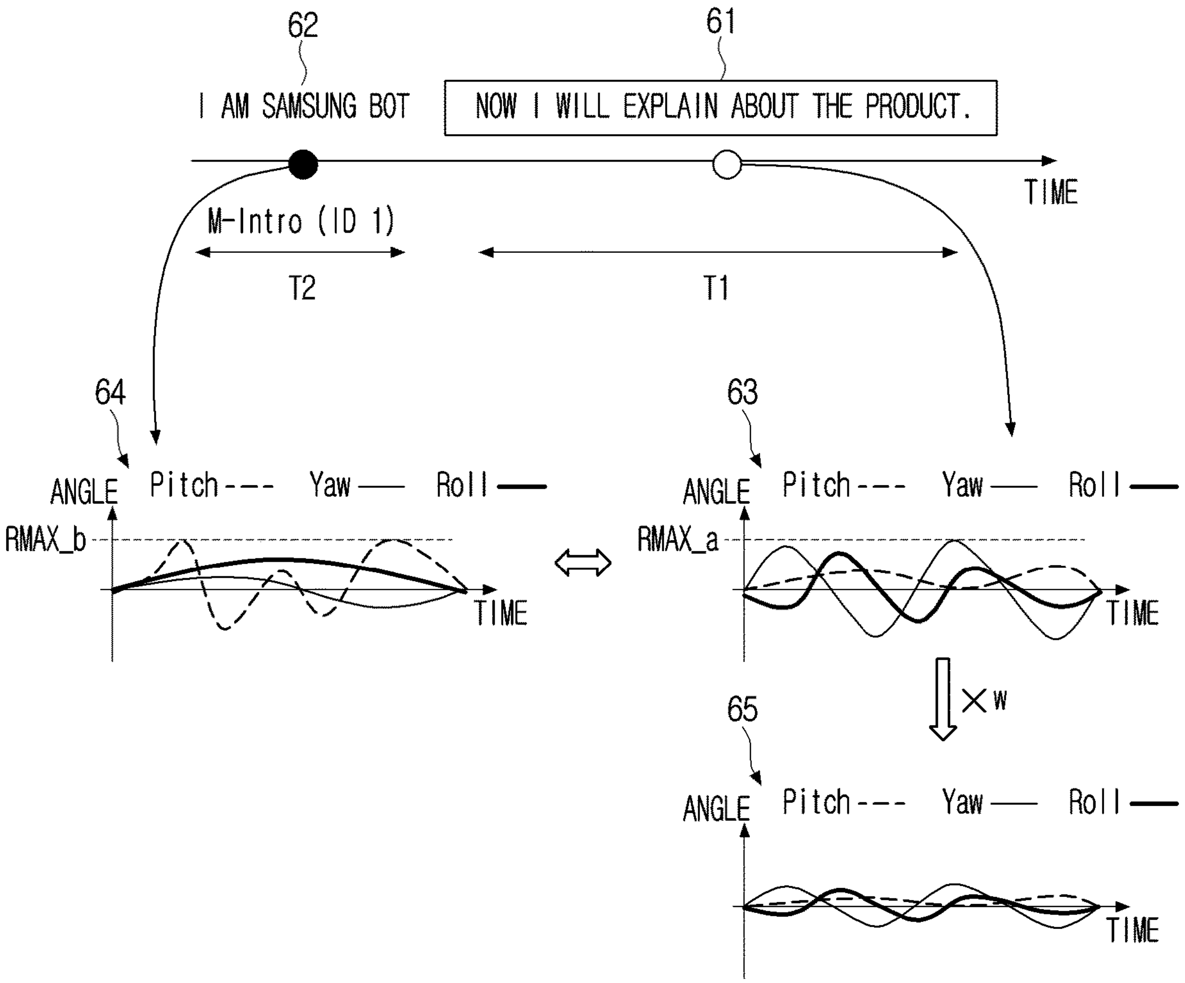
FIG. 6 is a diagram illustrating a method for controlling a motion size according to an embodiment of the disclosure.

FIG. 6 is a diagram illustrating a method for controlling a motion size according to an embodiment of the disclosure.

Referring to FIG. 6, the robot 100 may obtain first motion information 63 corresponding to a first sentence 61 and second motion information 64 corresponding to a second sentence 62. Each motion information may include rotation angles of the robot 100 or the elements of the robot 100 corresponding to each motion.

The robot 100 may determine whether to adjust the size of the first motion based on the first motion information 63 and the second motion information 64. The robot 100 may obtain a first maximum value RMAX-a of the size of the rotation angles corresponding to the first motion based on the first motion information 63. The robot 100 may obtain a second maximum value RMAX-b of the size of the rotation angles corresponding to the second motion based on the second motion information 64. If a ratio of the first maximum value RMAX-a to the second maximum value RMAX-b (that is, RMAX-a/RMAX-b) is greater than a threshold value (e.g., 0.5), the robot 100 may adjust the size of the first motion. If the ratio of the first maximum value RMAX-a to the second maximum value RMAX-b is less or equal to the threshold value (e.g., 0.5), the robot 100 may adjust the size of the first motion.

The robot 100 may adjust the size of the first motion based on the size of the first motion and the size of the second motion. For example, the robot 100 may obtain the ratio of the first maximum value RMAX-a to the second maximum value RMAX-b (that is, RMAX-a/RMAX-b) as a weight a. The robot 100 may adjust the size of the first motion based on the first motion information 63 and the weight w. The robot 100 may obtain third motion information 65 by multiplying the weight w by the rotation angles corresponding to the first motion. The third motion information may correspond to the first sentence 61.

Figure 7:
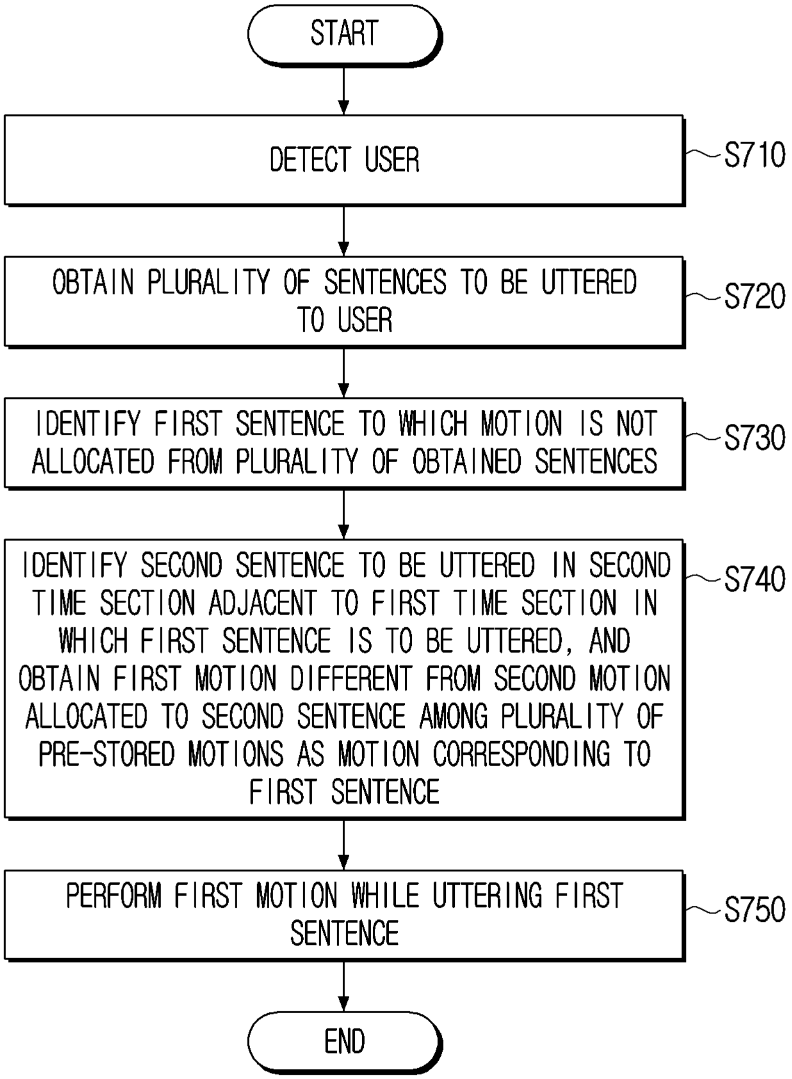
FIG. 7 is a flowchart illustrating a method for controlling a robot according to an embodiment of the disclosure.

FIG. 7 is a flowchart illustrating a method for controlling a robot according to an embodiment of the disclosure.

Referring to FIG. 7, the robot 100 may detect the user at operation S710. For example, the robot 100 may recognize the user by analyzing a captured image obtained through the camera.

The robot 100 may obtain a plurality of sentences to be uttered to the user at operation S720. The robot 100 may obtain a plurality of sentences stored in the memory 180 in advance. The robot 100 may obtain the plurality of sentences based on a user command. For example, the robot 100 may obtain the plurality of sentences for explaining about a refrigerator based on a user command ("Please explain about this refrigerator").

The robot 100 may identify a first sentence to which a motion to be performed while the robot 100 utters is not allocated among the plurality of obtained sentences at operation S730. For example, the robot 100 may identify the first sentence 11 of FIG. 1.

The robot 100 may identify a second sentence to be uttered in a second time section adjacent to a first time section in which the first sentence is to be uttered, and obtain a first motion different from a second motion allocated to the second sentence among the plurality of pre-stored motions as a motion corresponding to the first sentence at operation S740. The robot 100 may identify one or more motions having a similarity to the second motion lower than a predetermined value among the plurality of pre-stored motions. The robot 100 may obtain similarities between the plurality of pre-stored motions and the second motion by comparing histograms corresponding to the plurality of pre-stored motions and a histogram corresponding to the second motion. The robot 100 may identify one or more motions based on a similarity table including similarities between the plurality of pre-stored motions.

Meanwhile, the time section adjacent to the first time section may be in plural. For example, the first time section may be adjacent to the second time section and a third time section. The robot 100 may identify a third motion allocated to a third sentence to be uttered in the third time section. The robot 100 may obtain a first similarity between each of the plurality of pre-stored motions and the second motion and a second similarity between each of the plurality of pre-stored motions and the third motion. The robot 100 may obtain a plurality of average values of the first similarity and the second similarity corresponding to each of the plurality of pre-stored motions. The robot 100 may identify one or more average values less than a predetermined value among the plurality of average values and identify one or more motions corresponding to the one or more identified average values among the plurality of pre-stored motions.

The robot 100 may select one of the one or more identified motions randomly and obtain the motion as the first motion. The robot 100 may perform the first motion while uttering the first sentence at operation S750.

The robot 100 may adjust the size of the first motion. The robot 100 may obtain the size of the second motion based on the information on the second motion. If a ratio of the size of the first motion to the size of the second motion is greater than a threshold value, the robot 100 may adjust the size of the first motion based on the size of the first motion and the size of the second motion. The robot 100 may calculate the weight based on the ratio of the size of the first motion to the size of the second motion. The robot 100 may adjust the size of the first motion based on the weight so that the size of the first motion is less than the size of the second motion. If the ratio of the size of the first motion to the size of the second motion is less or equal to the threshold value, the robot 100 may maintain the size of the first motion.

Meanwhile, when a trigger event is detected or a user command is obtained, the robot 100 may obtain a plurality of sentence sets at once or may also generate sentences in real time while performing interaction with the user.

Figure 8:
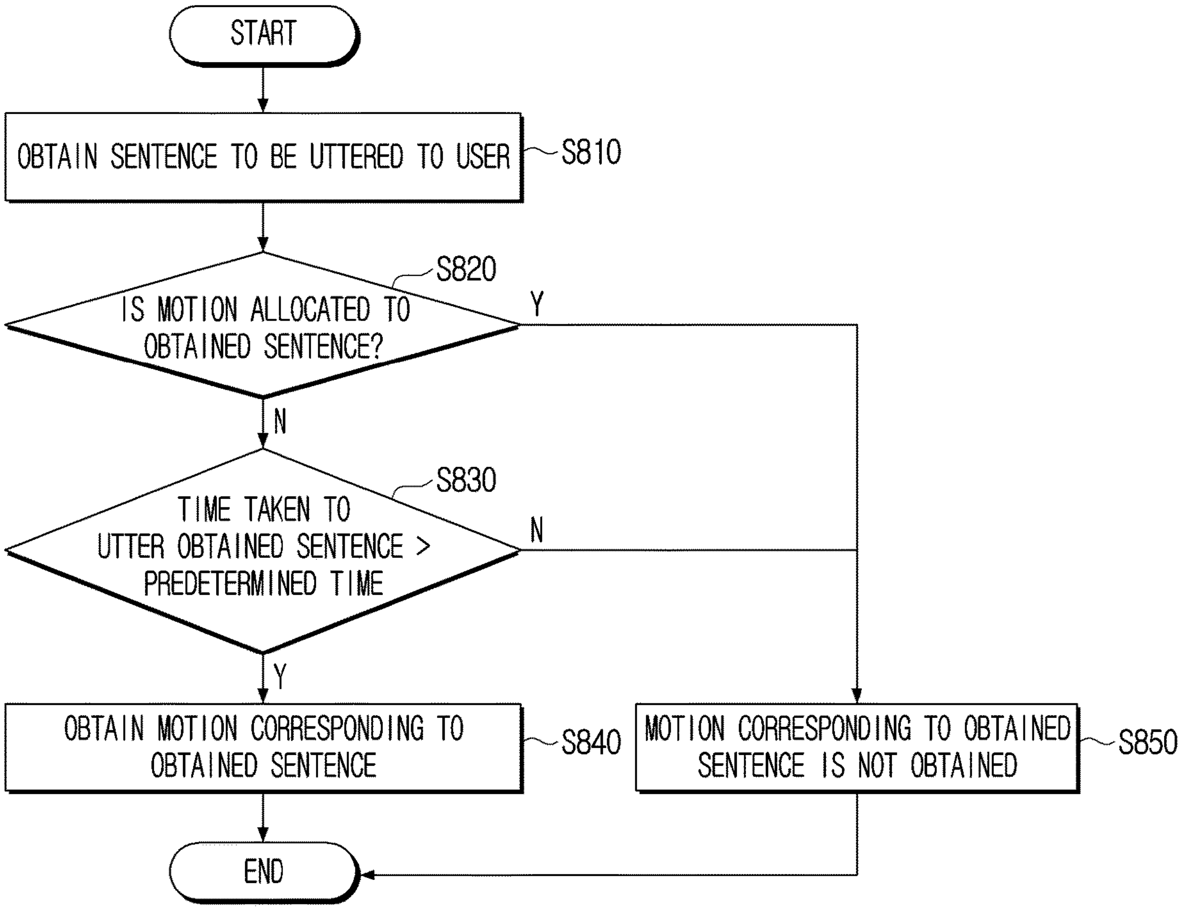
FIG. 8 is a flowchart illustrating a method for controlling a robot according to an embodiment of the disclosure.

FIG. 8 is a flowchart illustrating a method for controlling a robot according to an embodiment of the disclosure.

Referring to FIG. 8, the robot 100 may obtain a sentence to be uttered to a user at operation S810. When a trigger event is detected or a user command is obtained, the robot 100 may obtain the sentence to be uttered to the user. The robot 100 may obtain a sentence pre-stored in the memory 180 based on the trigger event or the user command. Alternatively, the robot 100 may generate the sentence to be uttered to the user based on the trigger event or the user command. For example, if a user voice command ("Where is the bathroom?") is obtained, a response sentence ("Please go straight this way 20 m").

The robot 100 may identify whether a motion is allocated to the obtained sentence at operation S820. For example, the sentence to which the motion is allocated may be matched to the identification information of the allocated motion and stored in the memory 180. The robot 100 may identify whether there is identification information of the stored motion that is matched to the obtained sentence, and determine whether the motion is allocated to the obtained sentence. When the robot 100 generates the sentence, the robot 100 may identify whether the generated sentence is stored in the memory 180. When the generated sentence is stored in the memory 180, the robot 100 may identify whether there is identification information of the stored motion that is matched to the obtained sentence, and determine whether the motion is allocated to the obtained sentence.

If the motion is allocated to the obtained sentence at operation S820-Y, the robot 100 may not obtain a motion corresponding to the obtained sentence at operation S850.

If the motion is not allocated to the obtained sentence at operation S820-N, the robot 100 may identify whether the time taken to utter the obtained sentence is greater than the predetermined time at operation S830. The robot 100 may obtain a voice message corresponding to the obtained sentence based on a text-to-speech (TTS) module. The robot 100 may determine whether a length of the voice message is longer than the predetermined time.

If the time taken to utter the obtained sentence is longer than the predetermined time at operation S830-Y, the robot 100 may obtain the motion corresponding to the obtained sentence at operation S840. The robot 100 may identify the motion corresponding to the sentence uttered in the time section adjacent to the time section in which the obtained sentence is to be uttered, and obtain a motion having a similarity to the identified motion less than a predetermined value.

If the time taken to utter the obtained sentence is equal to or less than the predetermined time at operation S830-N, the robot 100 may not obtain the motion corresponding to the obtained sentence at operation S850. In a case where the robot 100 utters a voice message corresponding to a plurality of sentences continuously, if the robot 100 performs a motion corresponding to the voice message having a length shorter than the predetermined time, an unnatural motion of the robot 100 may be shown. In order to prevent this, the robot 100 may not obtain the motion corresponding to the obtained sentence, if the time taken to utter the obtained sentence is equal to or less than the predetermined time. For example, if a length of "Hello" (1 second) of FIG. 1 is equal to or less than the predetermined time (5 seconds), the robot 100 may not perform the motion while uttering "Hello".

Meanwhile, computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time, such as a register, a cache, or a memory, but may refer to a medium that semi-permanently stores data and is readable by a machine. Specific examples of the non-transitory computer-readable medium may include a compact disc (CD), a digital video disc (DVD), a hard disk drive, a Blu-ray™ disc, a universal serial bus (USB), a memory card, and a read only memory (ROM).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
- a camera;
- a speaker;
- at least one motor;
- a memory storing one or more computer programs; and
- one or more processors communicatively coupled to the camera, the speaker, the motor and the memory,
- wherein the one or more computer programs include computer-executable instructions that, when executed by the one or more processors individually or collectively, cause the robot to:
  - detect a user based on an image obtained through the camera, based on the user being detected in the image, obtain a plurality of sentences to be uttered by the robot to the user, wherein the plurality of sentences are stored in the memory, identify whether a motion is allocated to the plurality of sentences, identify a first sentence to which a motion to be performed while the robot utters is not allocated among the plurality of sentences, identify a second sentence including a pre-allocated second motion, the second sentence to be uttered in a second time section adjacent to a first time section in which the first sentence is to be uttered, the pre-allocated second motion being pre-allocated when identifying the second sentence, identify one or more motions having a similarity to the second motion less than a predetermined value among a plurality of pre-stored motions in the memory, based on a time to utter the first sentence being greater or equal to a predetermined time, obtain a first motion different from the second motion pre-allocated to the second sentence among the identified one or more motions as a motion corresponding to the first sentence, and control the speaker to output a voice corresponding to the first sentence and control the at least one motor to perform the first motion in synchronization with the output of the voice corresponding to the first sentence, and based on the time to utter the first sentence being shorter than the predetermined time, control the speaker to output a voice corresponding to the first sentence without performing a motion.

2. The robot of claim 1, wherein the one or more computer programs further include computer-executable instructions that, when executed by the one or more processors individually or collectively, cause the robot to:

obtain the first motion by randomly selecting one of the identified one or more motions.

3. The robot of claim 2, wherein the one or more computer programs further include computer-executable instructions that, when executed by the one or more processors individually or collectively, cause the robot to obtain similarities between the plurality of pre-stored motions and the second motion by comparing histograms corresponding to the plurality of pre-stored motions and a histogram corresponding to the second motion.

4. The robot of claim 2, wherein the memory stores a similarity table including similarities between the plurality of pre-stored motions including the second motion, and wherein the one or more computer programs further include computer-executable instructions that, when executed by the one or more processors individually or collectively, cause the robot to obtain the first motion based on the similarity table.

5. The robot of claim 1, wherein the one or more computer programs further include computer-executable instructions that, when executed by the one or more processors individually or collectively, cause the robot to:

identify a third motion allocated to a third sentence to be uttered in a third time section that is adjacent to the first time section and different from the second time section, obtain first similarities between a plurality of pre-stored motions and the second motion and obtain second similarities between the plurality of pre-stored motions and the third motion, obtain a plurality of average values of the first similarities and the second similarities corresponding to the plurality of pre-stored motions, identify one or more average values less than a predetermined value among the plurality of average values and identify one or more motions corresponding to the one or more average values among the plurality of pre-stored motions, and identify one of the one or more motions randomly and obtain the motion as the first motion.

6. The robot of claim 1, wherein the one or more computer programs further include computer-executable instructions that, when executed by the one or more processors individually or collectively, cause the robot to:

obtain a size of the second motion based on information on the second motion, based on a ratio of a size of the first motion to the size of the second motion being greater than a threshold value, adjust the size of the first motion based on the size of the first motion and the size of the second motion, and based on the ratio of the size of the first motion to the size of the second motion being less or equal to the threshold value, maintain the size of the first motion.

7. The robot of claim 6, wherein the one or more computer programs further include computer-executable instructions that, when executed by the one or more processors individually or collectively, cause the robot to:

calculate a weight based on the ratio of the size of the first motion to the size of the second motion, and adjust the size of the first motion based on the weight so that the size of the first motion is less than the size of the second motion.

8. The robot of claim 1, wherein the first motion is based upon the second motion.

9. The robot of claim 1, wherein the obtaining of the first motion different from the second motion pre-allocated to the second sentence among the plurality of motions pre-stored in the memory is based on a time to utter the first sentence being greater than the predetermined time.

10. A method performed by a robot, the method comprising:

detecting, by the robot, a user;

based on the user being detected in an image, obtaining, by the robot, a plurality of sentences to be uttered by the robot to the detected user, wherein the plurality of sentences are stored in the robot;

identifying, by the robot, whether a motion is allocated to the plurality of sentences;

identifying, by the robot, a first sentence to which a motion to be performed while the robot utters is not allocated among the plurality of sentences;

identifying, by the robot, a second sentence including a pre-allocated second motion, the second sentence to be uttered in a second time section adjacent to a first time section in which the first sentence is to be uttered, the pre-allocated second motion being pre-allocated when identifying the second sentence;

identifying one or more motions having a similarity to the second motion less than a predetermined value among a plurality of pre-stored motions in a memory;

based on a time to utter the first sentence being greater or equal to a predetermined time, obtaining, by the robot, a first motion different from the second motion pre-allocated to the second sentence among the identified one or more motions as a motion corresponding to the first sentence, and outputting, by the robot, a voice corresponding to the first sentence and performing, by the robot, the first motion in synchronization with the output of the voice corresponding to the first sentence; and based on the time to utter the first sentence being shorter than the predetermined time, performing, by the robot, uttering the first sentence without performing a motion.

11. The method of claim 10, wherein the obtaining of the first motion comprises:

obtaining the first motion by randomly selecting one of the identified one or more motions.

12. The method of claim 11, wherein the identifying of the one or more motions comprises obtaining similarities between the plurality of pre-stored motions and the second motion by comparing histograms corresponding to the plurality of pre-stored motions and a histogram corresponding to the second motion.

13. The method of claim 11, wherein the robot stores a similarity table including similarities between the plurality of pre-stored motions including the second motion, and wherein the obtaining of the first motion comprises obtaining the first motion based on the similarity table.

14. The method of claim 10, wherein the obtaining of the first motion comprises:

identifying a third motion allocated to a third sentence to be uttered in a third time section that is adjacent to the first time section and different from the second time section;

obtaining first similarities between the plurality of pre-stored motions and the second motion and obtaining second similarities between the plurality of pre-stored motions and the third motion;

obtaining a plurality of average values of the first similarities and the second similarities corresponding to the plurality of pre-stored motions;

identifying one or more average values less than a predetermined value among the plurality of average values and identifying one or more motions corresponding to the one or more average values among the plurality of pre-stored motions; and identifying one of the one or more motions randomly and obtaining the motion as the first motion.

15. The method of claim 10, further comprising:

obtaining a size of the second motion based on information on the second motion;

based on a ratio of a size of the first motion to the size of the second motion being greater than a threshold value, adjusting the size of the first motion based on the size of the first motion and the size of the second motion; and based on the ratio of the size of the first motion to the size of the second motion being less or equal to the threshold value, maintaining the size of the first motion.

16. The method of claim 15, wherein the adjusting of the size of the first motion comprises:

calculating a weight based on the ratio of the size of the first motion to the size of the second motion; and adjusting the size of the first motion based on the weight so that the size of the first motion is less than the size of the second motion.

17. At least one non-transitory computer-readable recording medium on which a program for executing the method of claim 10 on a computer is recorded.

18. The method of claim 16, further comprising:

controlling a first voice message output timing and a first motion performing timing so that a time point when the first voice message starts to be output corresponds to a time point when the first motion starts to be performed.

19. The method of claim 18, further comprising:

obtaining a predetermined sentence when a trigger event is detected, wherein the trigger event includes an event in which the user is recognized within a predetermined distance from the robot.

20. One or more non-transitory computer-readable storage media storing one or more computer programs including computer-executable instructions that, when executed by one or more processors of a robot individually or collectively, cause the robot to perform operations, the operations comprising:

detecting, by the robot, a user;

based on the user being detected in an image, obtaining, by the robot, a plurality of sentences to be uttered by the robot to the detected user, wherein the plurality of sentences are stored in the robot;

identifying, by the robot, whether a motion is allocated to the plurality of sentences;

identifying, by the robot, a first sentence to which a motion to be performed while the robot utters is not allocated among the plurality of sentences;

identifying, by the robot, a second sentence including a pre-allocated second motion, the second sentence to be uttered in a second time section adjacent to a first time section in which the first sentence is to be uttered, the pre-allocated second motion being pre-allocated when identifying the second sentence;

identifying one or more motions having a similarity to the second motion less than a predetermined value among a plurality of pre-stored motions in a memory;

based on a time to utter the first sentence being greater or equal to a predetermined time, obtaining, by the robot, a first motion different from the second motion pre-allocated to the second sentence among the identified one or more motions as a motion corresponding to the first sentence; and outputting, by the robot, a voice corresponding to the first sentence and performing, by the robot, the first motion in synchronization with the output of the voice corresponding to the first sentence; and based on the time to utter the first sentence being shorter than the predetermined time, performing, by the robot, uttering the first sentence without performing a motion.

* * * * *